(12) United States Patent
Donnelly

(10) Patent No.: US 7,549,310 B2
(45) Date of Patent: Jun. 23, 2009

(54) MANDREL ASSEMBLY FOR MANUFACTURING TUBULAR PRODUCTS

(75) Inventor: William James Donnelly, Heidelberg (AU)

(73) Assignee: Nova-Duct Technologies Pty Ltd., Melbourne Vic. (AU)

( * ) Notice: Subject to any disclaimer, the term of this patent is extended or adjusted under 35 U.S.C. 154(b) by 0 days.

(21) Appl. No.: 11/630,429

(22) PCT Filed: Jun. 27, 2005

(86) PCT No.: PCT/AU2005/000937

§ 371 (c)(1),
(2), (4) Date: Jul. 31, 2007

(87) PCT Pub. No.: WO2006/000051

PCT Pub. Date: Jan. 5, 2006

(65) Prior Publication Data

US 2008/0060404 A1   Mar. 13, 2008

(30) Foreign Application Priority Data

Jun. 25, 2004   (AU)   ................................ 200403473

(51) Int. Cl.
*B21C 37/12* (2006.01)
*B21D 7/04* (2006.01)

(52) U.S. Cl. ........................................... 72/49; 72/149

(58) Field of Classification Search ............... 72/48–50, 72/135, 138, 139, 142, 143, 367.1, 371, 449; 242/537, 587, 532.6, 532.7, 535.3, 587.2
See application file for complete search history.

(56) References Cited

U.S. PATENT DOCUMENTS

| 4,149,924 | A | * | 4/1979 | Grobard | ..................... 156/353 |
| 4,438,643 | A | * | 3/1984 | Menzel et al. | ................. 72/49 |
| 4,957,586 | A | * | 9/1990 | Keldany et al. | ............. 156/428 |
| 5,945,138 | A | * | 8/1999 | Wise et al. | ................... 425/391 |

FOREIGN PATENT DOCUMENTS

| FR | 2827211 A | 1/2003 |
| JP | 56101832 A | 8/1981 |
| JP | 11218268 A | 8/1999 |
| JP | 11248055 A | 9/1999 |
| RU | 2157761 | 10/2000 |
| SU | 414129 | 7/1974 |
| WO | WO 99 20457 | 4/1999 |

* cited by examiner

*Primary Examiner*—Dana Ross
*Assistant Examiner*—Teresa Bonk
(74) *Attorney, Agent, or Firm*—Greer, Burns & Crain, Ltd.

(57) ABSTRACT

A mandrel assembly for manufacturing a tubular product, including: a first plate, a cantilever drive roller extending from the first plate, at least one cantilever idler roller extending from the first plate, and mechanism for rotating the drive roller whereby, in use, a strip may be engaged and advanced by the driver roller to the at least one idler roller and thereby wound about the rollers to form a tubular product.

34 Claims, 5 Drawing Sheets

MANDREL ASSEMBLY FOR MANUFACTURING TUBULAR PRODUCTS

FIELD OF THE INVENTION

The present invention relates to mandrels for manufacturing ducting and other tubular products. In a particularly preferred embodiment, the present invention relates to mandrels for manufacturing flexible tubular ducts such as ducting of the kind suitable for use in ducted heating and air conditioning systems.

BACKGROUND TO THE INVENTION

One way in which tubular products have been conventionally produced from a substrate has been to wind the substrate helically with a rotating drive system incorporating a mandrel with a series of rollers. The rollers are set in bearings located in plates which support one end of the rollers. Each of the rollers is set at a predetermined angle to produce a forward helix in the manufactured tube formed by the substrate. The mandrel is driven by externally applied means, such as a belt drive or roller drive, which applies pressure to the substrate and one or more of the rollers to effect rotational and helical motion of the substrate. The tubular product is formed by adjacent windings of the substrate being wound in contact and fixed together by adhesive.

In order to manufacture tubular products of differing diameter or from substrates of different width, the rollers of the helix are required to be realigned to produce the correct helix. Re-aligning of the rollers is particularly time consuming as the angle relative to the backing plate must be carefully calculated and each of the rollers finely adjusted.

Mandrels of the above-described kind periodically require maintenance to replace the bearings in which the rollers are set. The bearings require replacement as the forces applied to the bearings from the belt or roller drive are large when compared to the size of the bearings, and cause the bearings to wear excessively.

It is an object of the present invention to provide one or more improvements in mandrels for manufacturing ducts and other tubular products.

SUMMARY OF THE INVENTION

According to one aspect, the present invention provides a mandrel assembly for manufacturing a tubular product, including:

a first plate;

a cantilever drive roller extending from the first plate;

at least one cantilever idler roller extending from the first plate; and means to rotate the drive roller whereby, in use, a strip may be engaged and advanced by the driver roller to the at least one idler roller and thereby wound about the rollers to form a tubular product.

According to another aspect, the present invention provides a winding station for manufacturing a tubular product, the winding station including:

a first plate;

a drive roller extending from the first plate;

at least one idler roller extending from the first plate; and means to rotate the drive roller;

wherein the drive roller and the at least one idler roller are arranged for the drive roller to engage and advance a strip to the at least one idler roller to wind the substrate about the rollers to form a tubular product.

In a preferred embodiment, a motor is provided for driving the drive roller. Preferably, the drive roller is located at the top dead centre of the mandrel. The idler roller is preferably a plurality of spaced such rollers arranged in a closed loop that advantageously includes the drive roller.

The or each idler roller advantageously passes through a respective bearing, preferably self-aligning, in the first plate and is fitted to a second plate displaced behind the first plate. The first plate may be rotatably fixed to a spacer separating it from the second plate, and is thereby able to rotate in a vertical plane relative to the second plate.

The drive roller may include an extended portion for engagement by a connecting sleeve. The connecting sleeve is attached to the motor so that the drive roller may be driven. The drive roller may also include a surface treatment to assist in the engagement and subsequent advancement of the strip.

Preferably, the drive roller is positioned so that it to extends substantially perpendicular to the incoming strip forming the tubular product.

The mandrel assembly is advantageously mounted for rotation about an axis generally parallel to the plane of said first plate, whereby to offset the alignment of said idler rollers to an angle to correlate with the travel of the material forming said tubular product doing so with a helix of predetermined dimension. While said idler rollers are offset at said angle, said drive roller is positioned so that it extends substantially perpendicular to the incoming substrate forming the tube. The perpendicularly extending disposition of the drive roller may arise from relative rotation of said first and second plates about an axis normal to their planes to compensate for said rotation of the mandrel assembly.

One particular advantage of the present invention is that the mandrel may be used to manufacture a wide range of products as the mandrel is driven internally, and not by an external belt drive. One such example of this is flexible tubular duct having a p-shaped cross section.

BRIEF DESCRIPTION OF THE DRAWINGS

The present invention will now be further described, by way of example only, with reference to the accompanying drawings, in which.

EMBODIMENTS OF THE INVENTION

Figure 1:
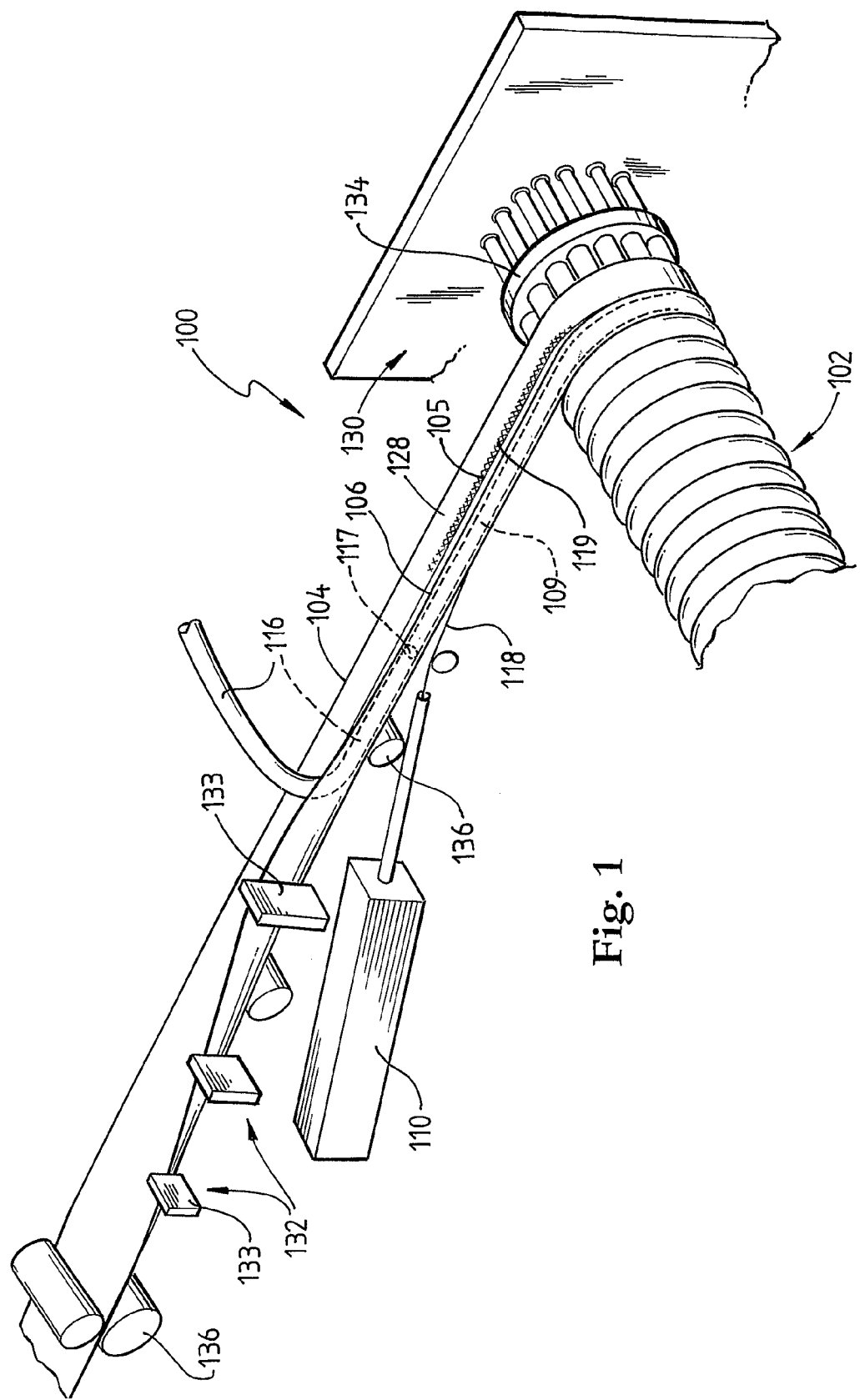
FIG. 1 is a layout diagram of apparatus for producing a tubular product, in particular flexible tubular duct, in accordance with a preferred embodiment of the invention.
Figure 2:
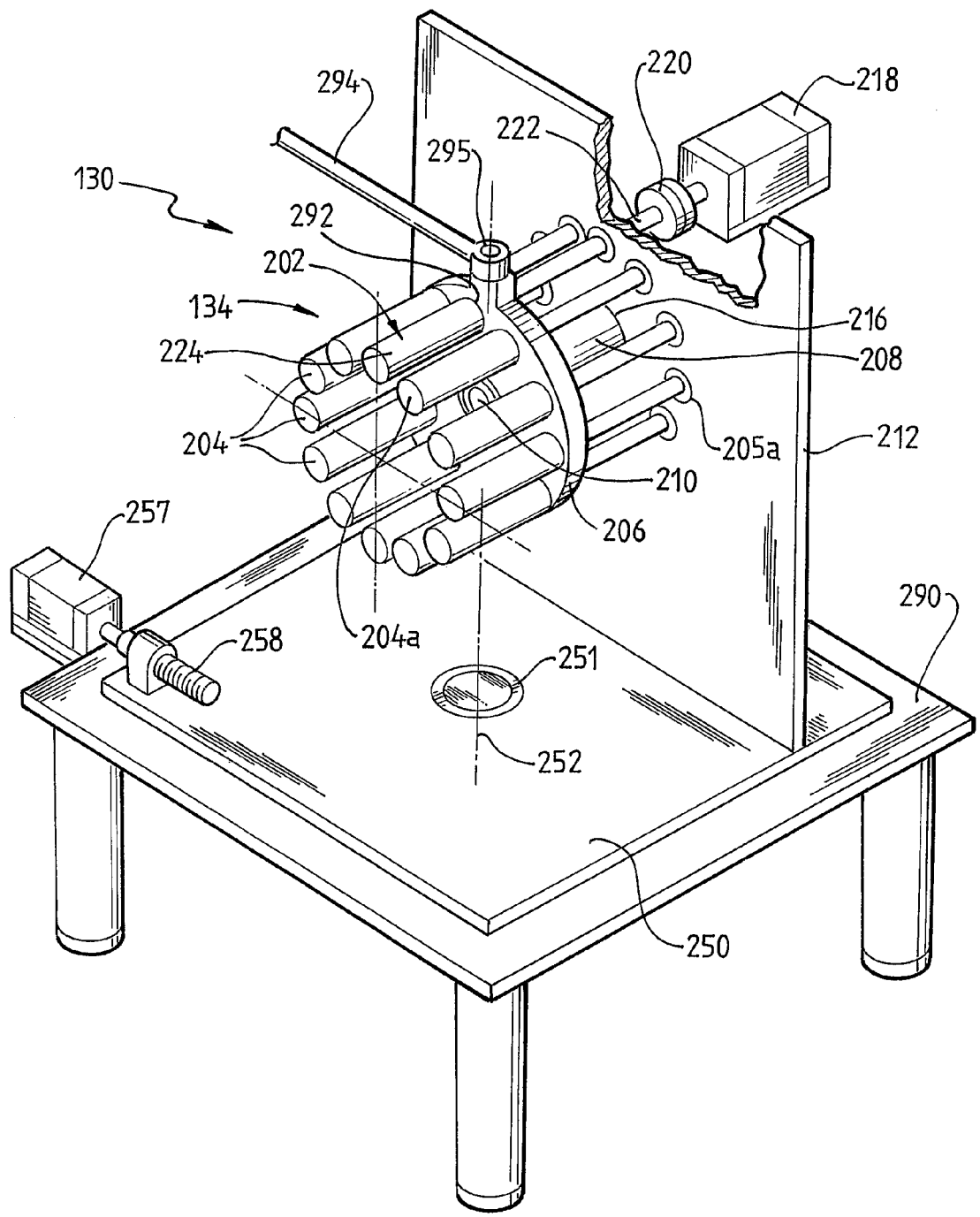
FIG. 2 is an isometric three-dimensional view of the winding station, including a mandrel assembly, depicted in the apparatus shown in FIG. 1.

FIG. 1 shows an apparatus 100 for manufacturing flexible tubular duct 102 in accordance with an embodiment of the invention. Apparatus 100 includes a winding station 130 having a mandrel 134 to which a strip 104 of flexible substrate material is fed, from a reel or other supply of the material, and helically wound, in a manner to be described, to form flexible tubular duct 102. Substrate feeding means 132 for feeding strip 104 to mandrel 134 comprises suitable guide structure depicted in FIG. 1 purely by representative diagram elements 136. Structure 136 also carries means 133 for bending the strip 104 to form a rounded encapsulating portion 106 of initial cross-section determined by a delivery tube 116 about which the strip is wrapped.

A core cavity is defined by delivery tube 116, downstream of the mouth 117 of the tube. A suitable insulating material is continuously fed via delivery tube 116 to form an insulating core 109 encapsulated by rounded portion 106 of strip 104. Rounded portion 106 is formed by only part of the width of strip 104: the balance remains substantially flat and defines a tail portion 128, so that the strip assumes the appearance of a P-shape in cross-section. The folded-over rounded portion 106 terminates in an edge lip 105 that folds out flat onto tail portion 128.

The third principal component of the duct is an elongate reinforcement element in the guise of a wire 118 that is delivered, by means 110 including suitable wire guides, against and under portion 128 so as to lie parallel to strip 104 and rounded portion 106.

The assembly of strip 104, wire 118 and rounded portion 106 encapsulating insulating core 109, is wound up helically on mandrel 134 so that successive windings abut and combine to form flexible duct 102. Duct 102 is formed such that the helix spacing is less than the external diameter of the core 109 of encapsulated insulating material. The duct has somewhat of the appearance of a lobster tail. The rounded encapsulating portion 106 of each successive winding overlies and abuts the tail portion 128 of the previous winding, and wire 118 is encapsulated between these two successive tail portions. An adhesive film 119 applied to the strip 104 by a suitable applicator, ensures that the edge lip 105 of the rounded encapsulating portion is adhered to its own tail portion at adhesive film 119, and that the rounded portion of the next winding is adhered to that tail portion. The successive windings might alternatively be adhered together by employing microwave welding or other heat sealing techniques.

The winding duct-formation process is generally similar to that described in Australian patent 773565, to which reference is here made for further detail.

It will also be appreciated that the mandrel may be used for producing tubular products for other applications such as non pre-insulated ducting or flexible mining hose.

Aspects of winding station 130 are shown in greater detail in FIGS. 2 to 6 Mandrel 134 includes a drive roller 202 and a series of idler rollers 204 carried by a circular first or front plate 206 and a second or back plate 212. The rollers 202, 204 project in cantilever fashion through and from front or first plate 206 and are arranged in a closed loop. Each roller is supported in a self-aligning bearing 205 (for a reason to be explained below) in an aperture towards the outside edge of the front plate 206. The drive roller 202 is located at the top dead centre of the mandrel.

Figure 6:
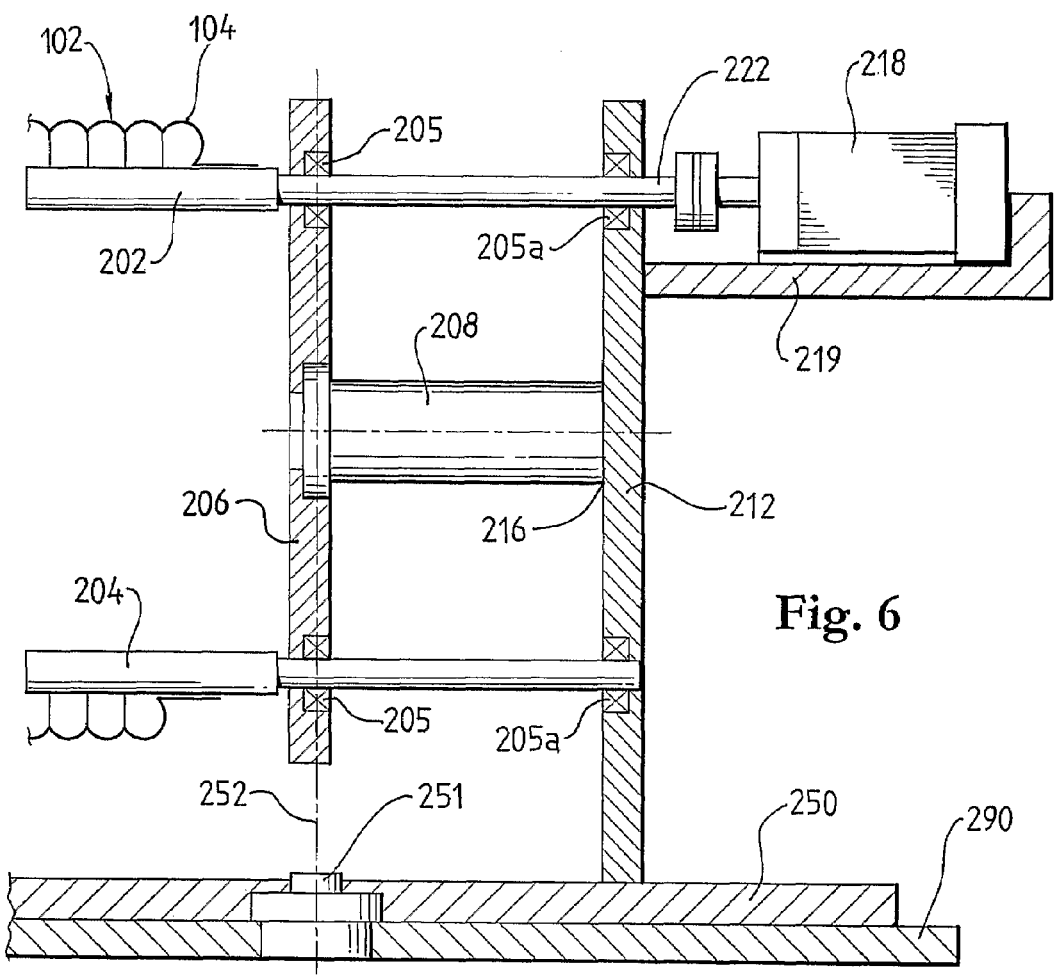
FIG. 6 is an axial cross-sectional view of the mandrel assembly during production.

Front plate 206 is co-axially rotatably connected to a spacer 208 by means of a centre nip screw 210. Spacer 208 is rigidly fixed to back or second plate 212 at 216 (FIG. 6). The rollers 202, 204 also pass through self-aligning bearings 205a in the back plate 212 and are secured in these bearings by fasteners, for example circlips.

The mandrel 134 is connected to a motor drive 218 by a connecting sleeve 220. The connecting sleeve 220 allows the motor drive 218 to be connected to the drive roller 202, which drivingly engages the strip 104 to advance the strip over the idler rollers 204 so that it thence winds about rollers 202, 204 and orbits the mandrel 134 to form the tubular product.

Drive roller 202 includes an extended portion 222 to engage with connecting sleeve 220 for driving the drive roller 202, and a cantilevered portion 224 to engage with the substrate 104. The drive roller also includes a surface treatment (not shown) applied to the cantilevered portion 224 to enhance the driving engagement with substrate 104.

The mandrel 134 and motor drive 218 are carried by back plate 212, which also serves as a support plate for the assembly. This support plate 212 is upstanding in a vertical plane from a base plate 250 that is rotatably mounted at 251 on a table 290 for rotation by a motor 257 with threaded drive 258, through fine angular displacements about a vertical axis 252. Axis 252 lies in the plane of front plate 206 and intersects the axis of drive roller portion 222. The rotation of base plate 250, and therefore of support plate 212, defines a selected helix angle in the manufacture of the tubular product.

It will be seen that axis 252 is also generally parallel to the planes of front plate 206 and back plate 212. Moreover, the top dead centre of drive roller 202 is held at a fixed position 292 relative to table 290 by a restraining bar 294 fixed to plate 206 at a three-dimensional flexible bearing 295.

Figure 3:
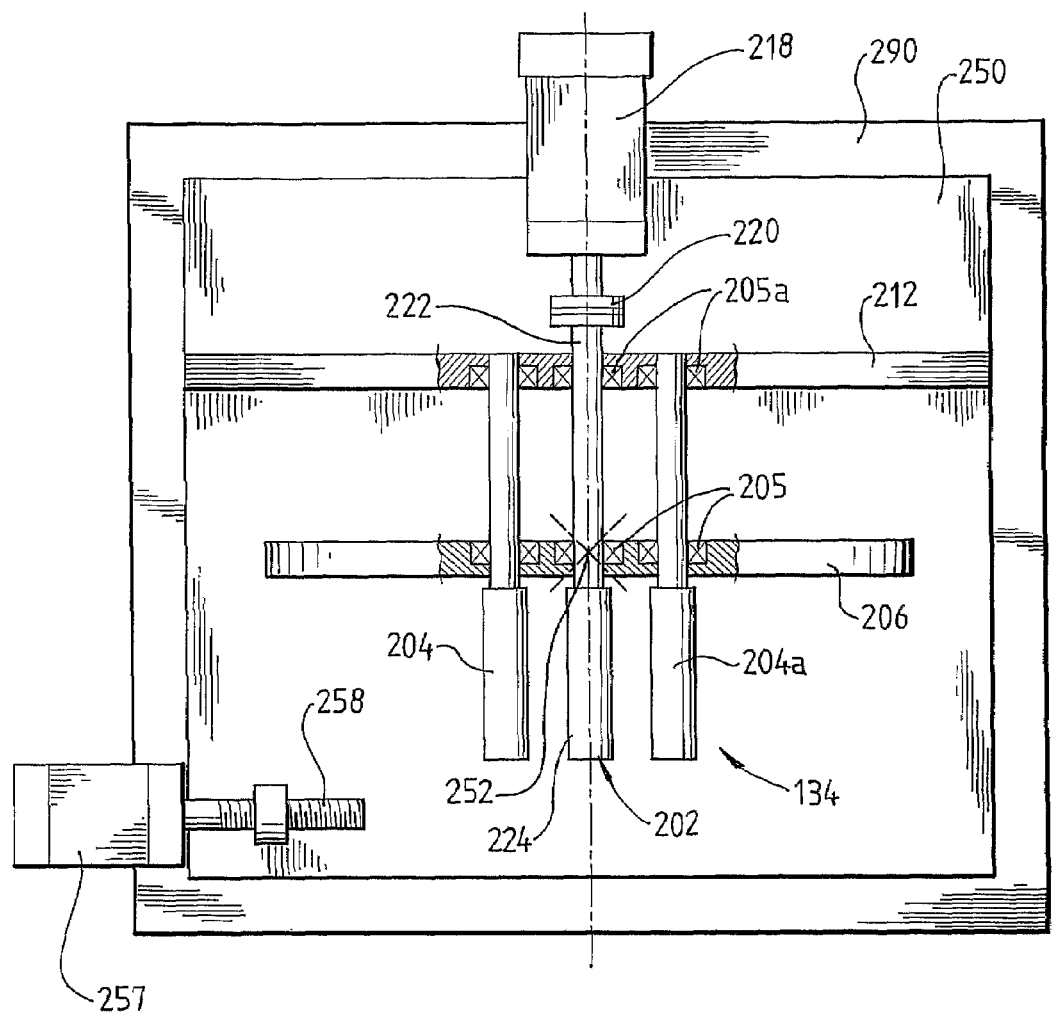
FIG. 3 is a diagrammatic, partly sectioned plan view of the winding station, as viewed in FIG. 2.
Figure 4:
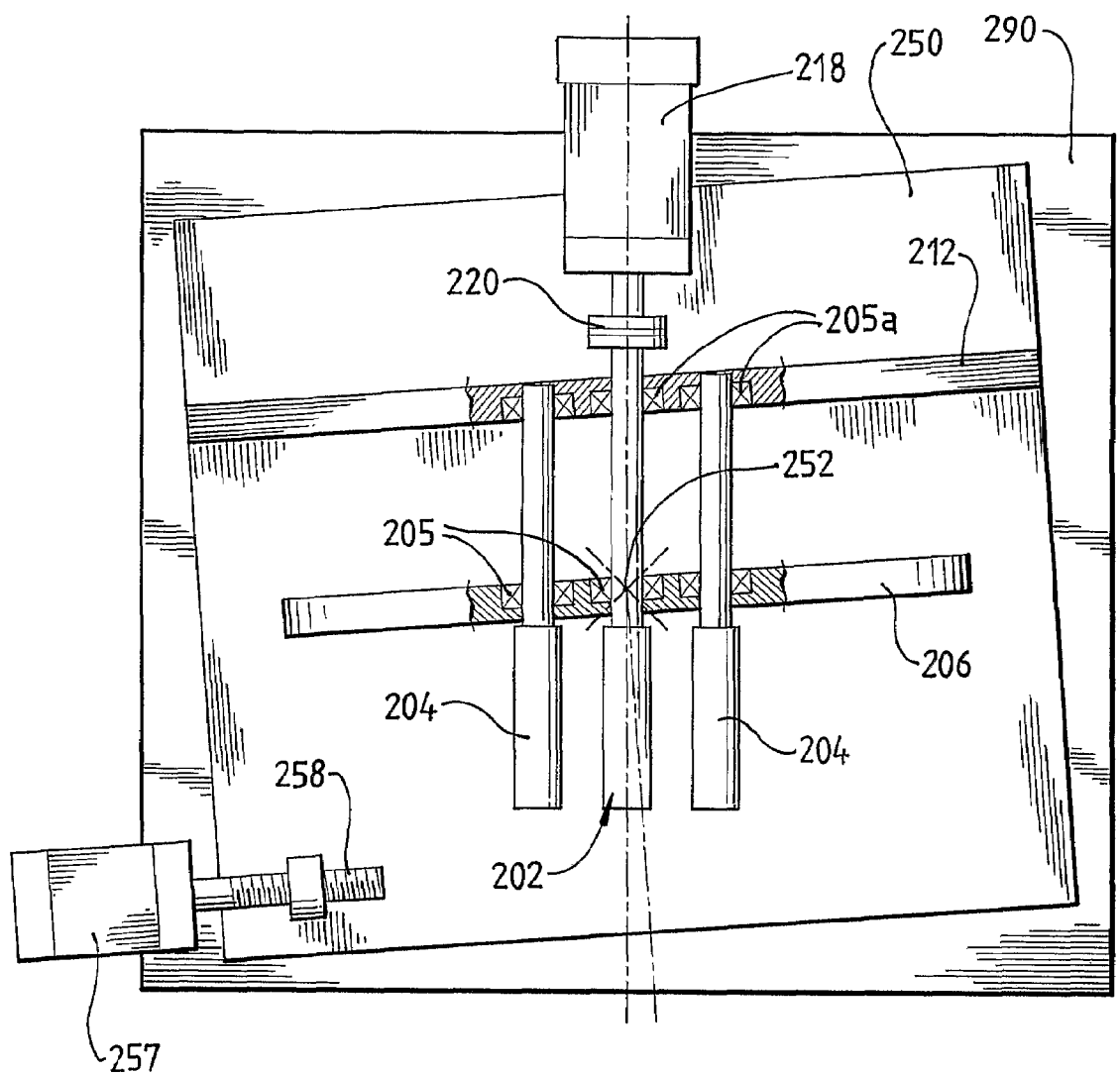
FIG. 4 is a view similar to FIG. 3 of the winding station after adjustment of the mandrel assembly to produce a helically wound product as shown in FIG. 1.
Figure 5:
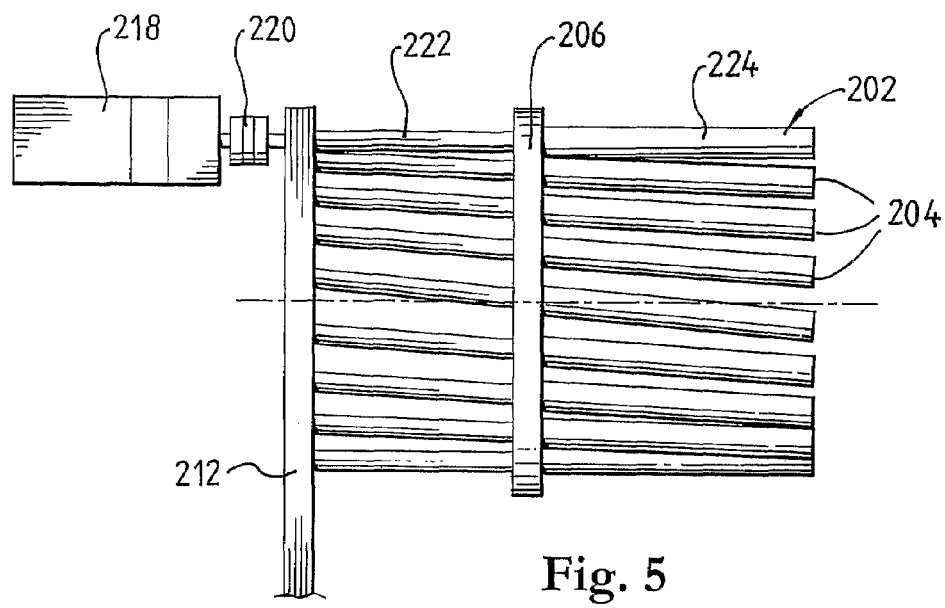
FIG. 5 is a side view of the mandrel assembly corresponding to FIG. 4.

FIGS. 3 and 4 are plan views showing the effect of a rotation of base plate 250 on the position of the mandrel relative to the incoming strip 104. The angle is exaggerated: in reality, base plate 250 needs to be rotated approximately 1 to 4° to induce a commercially acceptable helix in the tubular product.

Consider first the affect if position 292 was not fixed. With plates 206, 212 rotated about axis 252, all of rollers 202, 204 would be offset from the perpendicular to strip 104 by the selected angle. This is not the desired final condition: in order to continue the engagement and advancement of substrate material 104 from the substrate supply, the drive roller 202 is required to maintain a position which is perpendicular to the intake of strip 104 of substrate material. As such, because position 292 is restrained, i.e. fixed, by bar 294, the front plate 206 will rotate on its horizontal axis as base plate 250 rotates about axis 252, to realign the drive roller 202, accommodated by the self-aligning bearings 205 and 205a, to be perpendicular to the incoming substrate 104. As seen in FIG. 4, the drive roller 202 maintains an orientation at 90° to the incoming material. Idler rollers 204, while remaining parallel to roller 202 when viewed in plan, are inclined upwardly on one side and downwardly on the other, as best appreciated from the side view of FIG. 5. These inclinations are accommodated by self-aligning bearings 205, 205a.

In view of the adjustment of the alignment of drive roller 202 relative to back plate 212, motor drive 218 must correspondingly be able to adjust. To this end, motor drive 218 is fitted to mounts, e.g. on a cradle 219 (FIG. 6) carried by plate 212, that allow the motor drive to swivel slightly as the relative alignment of drive roller 202 alters. The output shaft of motor drive 218 is also flexibly supported by connecting sleeve 220, which is in turn connected to support plate 212. The motor drive 218 is flexibly connected so as to remain unstressed when the support plate 212 is rotated to accommodate the helix.

In operation, the drive roller 202 is rotated by motor drive 218 to advance substrate strip 104 from drive roller 202 to the first idler roller (204a in FIG. 2) in the closed loop arrangement of idler rollers, and thence the strip 104 helically orbits mandrel 134 to manufacture a tubular product. The idler rollers 204 rotate in self-aligning bearings 205, 205a as the strip 104 advances successively about the idler rollers. The edge lip (105 in FIG. 1) of the rounded encapsulating portion is adhered to its own tail portion at adhesive film 119, and the rounded portion of the next winding is adhered to that tail portion. FIG. 6 is an axial cross-sectional view of the mandrel assembly during operation.

It will be noted that the substrate 104 itself forms a belt-like action on the mandrel at the completion of the first helixing orbit. In order for this sequence to maintain rotational helixing stability, a degree of tension or braking effect must be provided to the supply of the substrate means 104. Additionally, the wire re-enforcement dispensing means may also maintain a degree of tension (or breaking effect) as between the drive roll 202 and the parallel incoming substrate 104 and wire 118. The circumstances thus created cause a tightening of the substrate (and the wire re-enforcement) against the rotating surfaces of the rollers 202, 204, thus negating the normal requirement for an external driving force such as a separate drive belt or drive roller means.

The manufacture of the tubular product may be further enhanced by the use of substrates for strip 104 having additives that aid the surface grip characteristics in rotating the idler rollers. Such additives may include adhesives which maintain grip on the idler rollers, but do not affect the finished tubular product.

A significant advantage of the described mandrel is that minimal time is required to adjust the back plate 212 and rollers 202, 204 for manufacturing tubular products of various size helixes. Motor 257 may have multiple digital settings preset to correspond to a variety of helix outcomes: adjustment then involves simply selecting and activating one of these settings. A further advantage is that, by virtue of the aforementioned tension or braking effect and of the surface finish on the cantilevered portion of the drive roller, the mandrel is able to engage and advance the strip 104 of substrate material to form a helical tubular product without the need for an exterior drive belt, thereby extending the life of the bearings supporting the rollers.

As described above, the mandrel 134 is adjusted for a selected helix angle by rotating turntable 250 and then rotating front plate 206 to re-adjust the position of drive roller 202. In a more automated arrangement, roller 202 may have its alignment axis fixed at two spaced points so that rotation of turntable 250 and support plate 212, e.g. with a servo motor geared to accurately make fine rotational adjustments in the range 1°-4°, produces a simultaneously compensatory rotation of front plate 206.

The invention claimed is:

1. A mandrel assembly for manufacturing a tubular product, including:
   a first plate;
   a cantilever drive roller extending from the first plate;
   a plurality of spaced further cantilever rollers extending from the first plate each, said further cantilever roller having an axis that defines an alignment of the respective roller; and
   means for rotating the cantilever drive roller whereby, in use, a strip may be engaged and advanced by the cantilever drive roller and thereby wound about the rollers to form a tubular product;
   wherein the mandrel assembly is mounted for rotation about an axis generally parallel to said first plate to offset said alignment of said further cantilever rollers, while said cantilever drive roller is positionable so that it extends not parallel to the further cantilever rollers but substantially perpendicularly to the strip as it is engaged by the cantilever drive roller, whereby the strip is wound about the rollers with a helix of predetermined dimension.

2. A mandrel assembly according to claim 1, further including a motor for driving the cantilever drive roller.

3. A mandrel assembly according to claim 1, wherein the cantilever drive roller is located at a top dead centre of the mandrel assembly.

4. A mandrel assembly according to claim 1, wherein the cantilever drive roller and spaced further cantilever rollers are arranged in a closed loop.

5. A mandrel assembly according to claim 4, wherein the spaced further cantilever rollers comprise idler rollers.

6. A mandrel assembly according to claim 5, wherein the cantilever drive roller is located at a top dead centre of the mandrel assembly.

7. A mandrel assembly according to claim 6, wherein the cantilever drive roller includes an extended portion for engagement by a connecting sleeve.

8. A mandrel assembly according to claim 1, wherein roller passes through a respective bearing in said first plate and is fitted to a second plate displaced behind the first plate.

9. A mandrel assembly according to claim 8, wherein each bearing is a self-aligning bearing.

10. A mandrel assembly according to claim 8, wherein the first plate is rotatably fixed to a spacer separating it from the second plate, and is able to rotate in a vertical plane relative to the second plate.

11. A mandrel assembly according to claim 8, wherein said positioning of the cantilever drive roller arises from said rotation of the mandrel assembly about an axis generally parallel to said first plate being coordinated with relative rotation of said first and second plates about an axis normal to the first and second plates.

12. A mandrel assembly according to claim 11, wherein said offset is to an angle of 1° to 4°.

13. A mandrel assembly according to claim 11, wherein each bearing is a self aligning bearing.

14. A mandrel assembly according to claim 1, wherein the cantilever drive roller includes an extended portion for engagement by a connecting sleeve.

15. A mandrel assembly according to claim 14, wherein the connecting sleeve is attached to the rotating means so that the cantilever drive roller may be driven.

16. A mandrel assembly according to claim 1, wherein the cantilever drive roller includes a surface treatment to assist in driving engagement with and subsequent advancement of said strip.

17. A mandrel assembly according to claim 1, wherein said offset is to an angle of 1° to 4°.

18. A mandrel assembly according to claim 1, wherein the cantilever drive roller is located at a top dead centre of the mandrel assembly.

19. A mandrel assembly according to claim 1, wherein the cantilever drive roller and spaced further cantilever rollers are arranged and spaced apart in a closed loop.

20. A winding station for manufacturing a tubular product, the winding station including:
   a first plate;
   a cantilever drive roller extending form the first plate;
   plurality of spaced further cantilever rollers extending from the first plate, each said further cantilever roller having an axis that defines an alignment of the respective roller; and
   means for rotating the cantilever drive roller;
   wherein the cantilever drive roller and further cantilever rollers together form a mandrel assembly arranged for the cantilever drive roller to engage and advance a strip to wind the strip about the rollers to form a tubular product;

wherein the mandrel assembly is mounted for rotation about an axis generally parallel to said first late to offset said alignment of further cantilever rollers, while said cantilever drive roller is positionable so that it extends not parallel to the further cantilever rollers but substantially perpendicular to the strip as it is engaged by the cantilever drive rollers, whereby the strip is wound about the rollers with a helix of predetermined dimensions.

21. A winding station according to claim 20, wherein the cantilever drive roller is located at a top dead centre of the mandrel assembly.

22. A winding station according to claim 21, wherein the cantilever drive roller and spaced further cantilever rollers are arranged and spaced apart in a closed loop.

23. A winding station according to claim 22, wherein the spaced further cantilever rollers comprise idler rollers.

24. A winding station according to claim 23, wherein the cantilever drive roller includes an extended portion for engagement by a connecting sleeve.

25. A winding station according to claim 22, wherein each roller passes through a respective bearing in said first plate and is fitted to a second plate displaced behind the first plate.

26. A winding station according to claim 25, wherein each bearing is a self-aligning bearing.

27. A winding station according to claim 25, wherein the first plate is rotatably fixed to a spacer separating it from the second plate, and is able to rotate in a vertical plane relative to the second plate.

28. A winding station according to claim 25, wherein said positioning of the cantilever drive roller arises from said rotation of the mandrel assembly about an axis generally parallel to said first plate being coordinated with relative rotation of said first and second plates about an axis normal to the first and second plates.

29. A winding station according to claim 28, wherein said offset is to an angle of 1° to 4°.

30. A winding station according to claim 28, wherein each bearing is a self aligning bearing.

31. A winding station according to claim 20, wherein the cantilever drive roller includes an extended portion for engagement by a connecting sleeve.

32. A winding station according to claim 31, wherein the connecting sleeve is attached to the rotating means so that the cantilever drive roller may be driven.

33. A winding station according to claim 20, wherein the cantilever drive roller includes a surface treatment to assist in driving engagement with and subsequent advancement of the strip.

34. A winding station according to claim 20, wherein said offset is to an angle of 1° to 4°.

* * * * *